United States Patent
Soto

(10) Patent No.: US 8,327,987 B2
(45) Date of Patent: Dec. 11, 2012

(54) TORQUE CONVERTER WITH LOCK-UP CLUTCH HAVING A SPLIT PISTON

(75) Inventor: Andre Soto, Tallmadge, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 916 days.

(21) Appl. No.: 12/291,611

(22) Filed: Nov. 12, 2008

(65) Prior Publication Data

US 2009/0133979 A1 May 28, 2009

Related U.S. Application Data

(60) Provisional application No. 61/003,107, filed on Nov. 14, 2007.

(51) Int. Cl.
*F16H 45/02* (2006.01)
*B23P 11/00* (2006.01)

(52) U.S. Cl. .......................... 192/3.29; 29/428

(58) Field of Classification Search .......... 192/3.29, 192/85.44, 200; 29/428
See application file for complete search history.

(56) References Cited

U.S. PATENT DOCUMENTS

| | | | |
|---|---|---|---|
| 6,394,243 B1 * | 5/2002 | Sasse | 192/3.29 |
| 6,708,804 B2 * | 3/2004 | Krause et al. | 192/3.29 |
| 6,742,637 B2 * | 6/2004 | Ackermann | 192/3.29 |
| 6,938,744 B2 * | 9/2005 | Tomiyama | 192/3.29 |
| 7,011,196 B2 | 3/2006 | Sudau | |
| 7,083,029 B2 * | 8/2006 | Seebacher et al. | 192/3.29 |
| 7,287,630 B2 * | 10/2007 | Takahashi | 192/3.29 |
| 2002/0033310 A1 * | 3/2002 | Sasse et al. | 192/3.29 |
| 2003/0029685 A1 * | 2/2003 | Bauer et al. | 192/3.29 |
| 2003/0221926 A1 * | 12/2003 | Arhab et al. | 192/3.29 |
| 2005/0039998 A1 * | 2/2005 | Zuehl et al. | 192/3.29 |
| 2007/0251788 A1 * | 11/2007 | Heck et al. | 192/3.29 |
| 2008/0142325 A1 * | 6/2008 | Degler et al. | 192/3.29 |
| 2008/0173510 A1 * | 7/2008 | Saka | |

* cited by examiner

*Primary Examiner* — Gregory Binda
*Assistant Examiner* — Josh Skroupa
(74) *Attorney, Agent, or Firm* — Davidson, Davidson & Kappel, LLC

(57) ABSTRACT

A torque converter including a housing, a lock-up clutch, the lock-up clutch having a split piston having a radial inner portion and a radial outer portion, and a drive plate connecting the housing and the outer portion.

19 Claims, 3 Drawing Sheets

TORQUE CONVERTER WITH LOCK-UP CLUTCH HAVING A SPLIT PISTON

Priority to U.S. Provisional Patent Application Ser. No. 61/003,107, filed Nov. 14, 2007, is claimed, the entire disclosure of which is hereby incorporated by reference herein.

The present invention relates generally to dual friction surface torque converters.

BACKGROUND

U.S. Pat. No. 7,011,196, hereby incorporated by reference herein, describes a bridge or lock-up clutch for a hydrodynamic torque converter.

FIG. 1 shows a cross section of a prior art torque converter 10. Torque converter 10 includes a pump shell 2 and a housing 4. Housing 4 includes a lock up clutch 6 with a piston 8. Piston 8 is attached to leaf springs 16. Leaf springs 16 are connected to a drive plate 12 via rivet 14. Drive plate 12 is welded to cover 4 at the inner diameter of drive plate 12 at location 20.

SUMMARY OF THE INVENTION

An object of the invention is to provide a more convenient method of attaching the piston to the front cover maintaining the pistons ability to move axially. The prior art requires welding for attachment to the cover, which can be more expensive and lead to contamination or distortion. If the drive plate is moved to the engine side of the piston, between the piston and the cover, this may allow an extruded rivet to be used to attach the drive plate directly to the cover, with no need for welding or an additional component to weld to. However, this arrangement requires the rivet to be stripped from inside the cover forcing the piston bore to be larger than the riveting diameter. The balancing of riveting diameter and piston bore diameter becomes increasingly difficult to adjust with increased torque requirements.

The present invention provides a torque converter including a housing; a lock-up clutch, the lock-up clutch having a split piston having a radial inner portion and a radial outer portion; and a drive plate connecting the housing and the outer portion.

Figure 2:
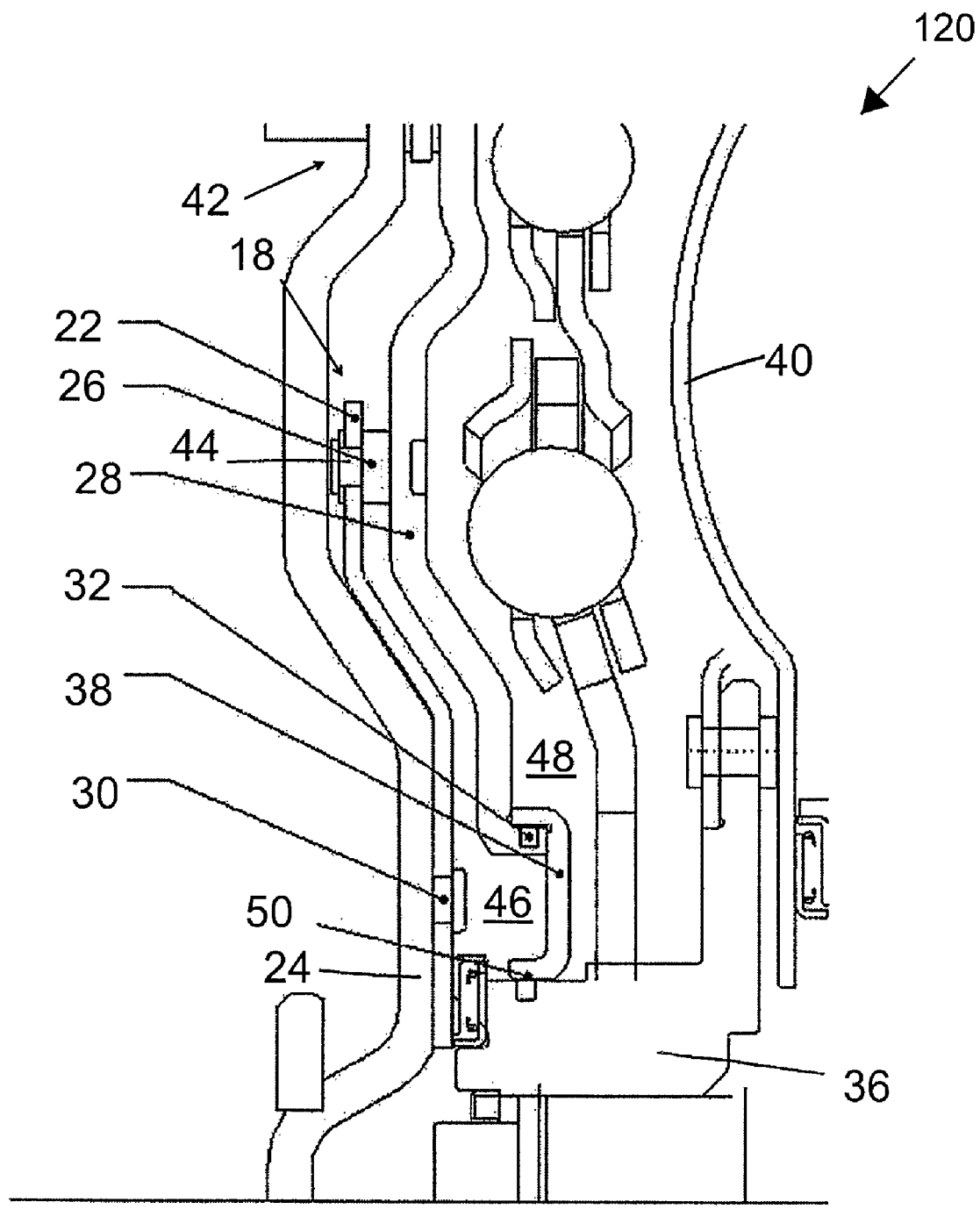

Further features and advantages of the invention will become apparent from the following detailed description taken in conjunction with the accompanying drawing, in which:

FIG. 2 illustrates a sectional view of a torque converter in the present invention.

Figure 3:
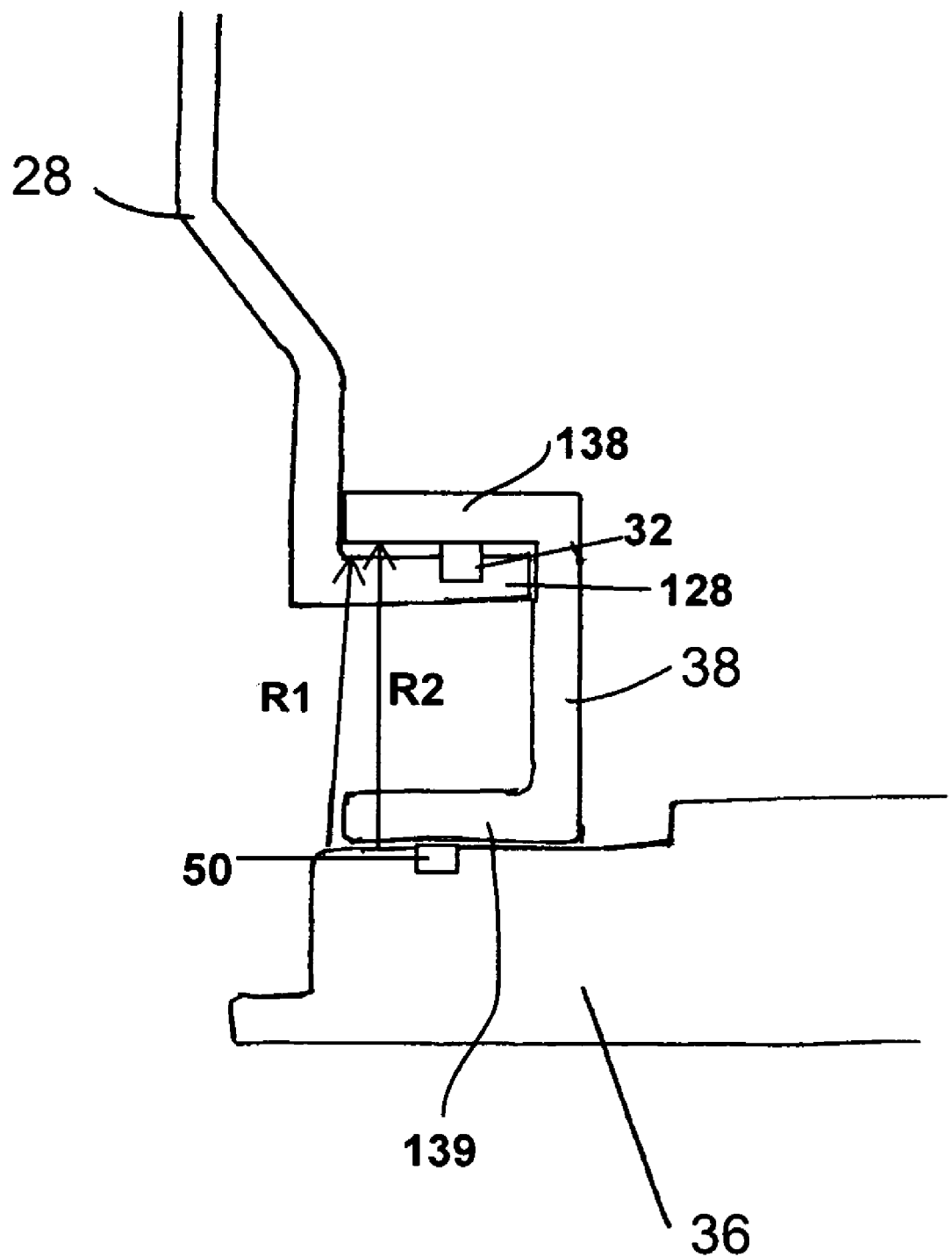

FIG. 3 illustrates the spilt piston.

DETAILED DESCRIPTION

Figure 1:
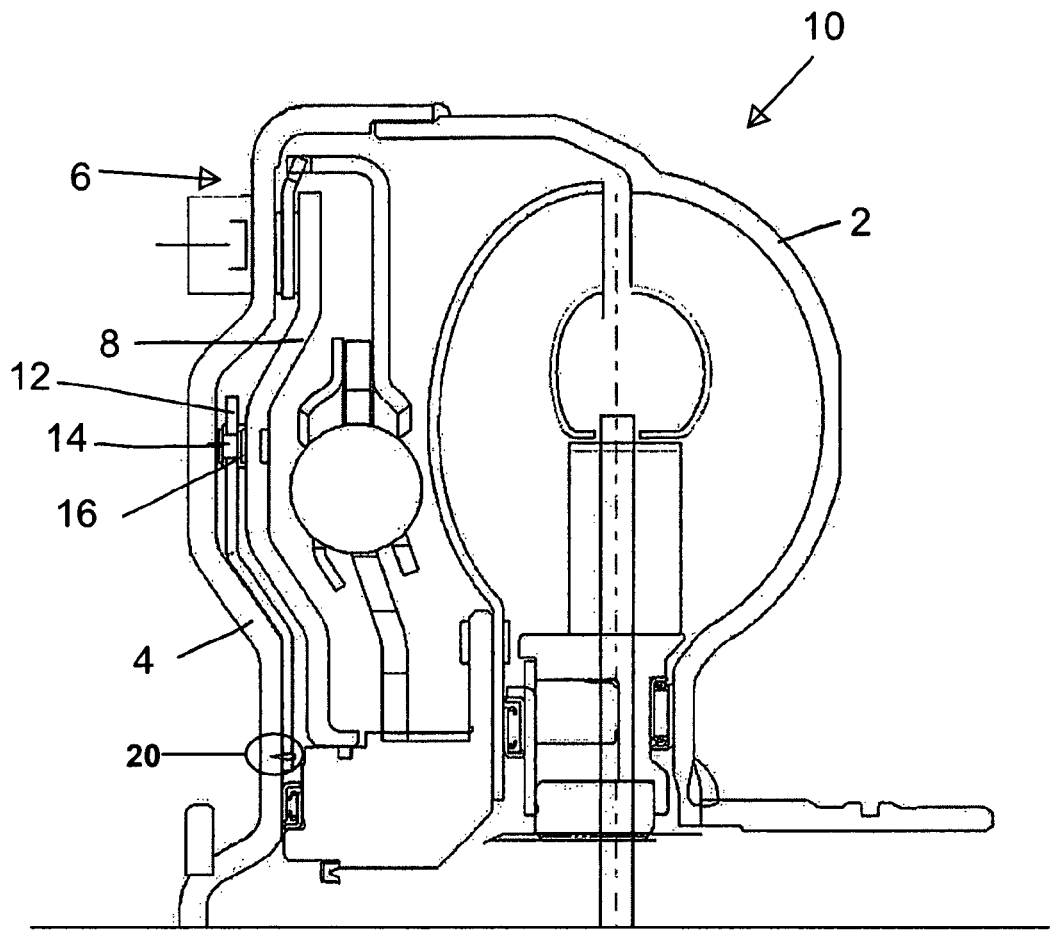
FIG. 1 illustrates a sectional view of a torque converter in the current state of the art.

FIG. 2 shows a section of torque converter 120 which is similar in structure to the torque converter in FIG. 1 with some exceptions discussed below. Torque converter 120 includes a housing 24, a turbine 40 and a lock up clutch 42. Lock-up clutch 42 has a split piston 18 with a radial inner portion 38 and a radial outer portion 28. Radial inner portion 38 and radial outer portion 28 can be made of metal to form their ring structure.

Radial outer portion 28 of piston 18 is attached to leaf springs 26. Leaf springs 26 are connected to a drive plate 22 via rivet 44. Drive plate 22 is connected to housing 24 via a rivet 30. After drive plate 22 is riveted to housing 24, radial inner portion 38 can be assembled to outer portion 28. In addition to assembled piston 18, this creates a first chamber 46 in between assembled piston 18, drive plate 22 and housing 24. A second chamber 48 is also created in between the assembled piston 18 and turbine 40. Chambers 46 and 48 are subject to different pressures to engage or disengage lock up clutch 42. Split piston 18 is assembled to form a piston having a proper size for the apply force as determined by the piston surfaces from chambers 46 and 48. Radial inner portion 38 and radial outer portion 28 preferably have a seal 32, for example, made of rubber, between them to prevent pressure loss. Radial inner portion 38 is connected to a turbine hub 36. A seal 50, also for example, made of rubber, may be located between turbine hub 36 and radial inner portion 38.

FIG. 3 illustrates split piston 18. Radial inner portion 38 may be C shaped so that an outer radial leg 138 has an inner radial surface having a radius R2. Radial outer portion 28 may have an axially extending flange 128 having a radial outer surface of radius R1. Flange 128 and leg 138 have different radii creating a clearance between the two. The clearance between flange 128 and leg 138 allows for manufacturing tolerances and assembly. Radial inner portion 38 has an inner radial leg 139. Inner radial leg 139 contacts turbine hub 36.

The present invention allows the bore of piston 18 and the riveting location of drive plate 22 to be decoupled. It provides a cost improvement or design enhancement by reducing the number of components or reducing the damage due to welding, as well as improving ease of assembly.

What is claimed is:

1. A torque converter comprising:
    a housing;
    a lock-up clutch, the lock-up clutch having a split piston having a radial inner portion and a radial outer portion, each of the radial inner portion and radial outer portion of the piston being axially movable with respect to the housing, the radial inner portion axially movable with respect to the radial outer portion, the radial outer portion axially movable with respect to the radial inner portion;
    a seal between the radial inner portion and the radial outer portion; and
    a drive plate connecting the housing and the radial outer portion.

2. The torque converter as recited in claim 1 wherein the drive plate is connected to the housing via a rivet.

3. The torque converter as recited in claim 1 wherein the radial outer portion is connected to the drive plate with leaf springs.

4. The torque converter as recited in claim 1 wherein the drive plate is located between the radial outer portion and the housing.

5. The torque converter as recited in claim 1 wherein the radial outer portion has an axially extending flange connected to the radial inner portion with the seal, the seal being on a radial outer surface of the flange.

6. The torque converter as recited in claim 5 wherein the radial inner portion is C shaped and an inner radial surface of a first outer leg of the radial inner portion has a clearance from the outer radial surface of the axially extending flange.

7. The torque converter as recited in claim 5 wherein the radial inner portion has a second outer leg contacting a turbine hub.

8. The torque converter recited in claim 1 wherein a first axial side of the radial inner portion and a first axial side of the radial outer portion both face a first chamber formed between the piston, the drive plate and the housing, a second axial side of the radial inner portion and a second axial side of the radial outer portion both facing a second chamber formed between the piston and a turbine connected to the turbine hub.

9. The torque converter recited in claim 1 further comprising an additional seal between an inner radial surface of the radial inner portion and the turbine hub, the seal preventing fluid from flowing between the first chamber and the second chamber along the inner radial surface of the radial inner portion.

10. The torque converter recited in claim 1 wherein the radial inner portion is not connected to the housing.

11. A method for assembling a torque converter having a lock-up clutch comprising:
   attaching a radial outer portion of a piston of the lock-up clutch to a drive plate; and
   attaching a radial inner portion of the piston to the radial outer portion, each of the radial inner portion and radial outer portion of the piston being axially movable with respect to a housing, the radial inner portion axially movable with respect to the radial outer portion, the radial outer portion axially movable with respect to the radial inner portion, a seal being located between the radial inner portion and the radial outer portion.

12. The method recited in claim 11 further comprising attaching the drive plate to the housing, a first axial side of the radial inner portion and a first axial side of the radial outer portion both forming a first chamber between the piston, the drive plate and the housing.

13. The method recited in claim 12 further comprising placing a turbine hub adjacent to an inner radial surface of the radial inner portion and placing an additional seal between the inner radial surface of the radial inner portion and the turbine hub.

14. The method recited in claim 13 wherein a second axial side of the radial inner portion and a second axial side of the radial outer portion both face a second chamber formed between the piston and a turbine connected to the turbine hub.

15. The method recited in claim 14 wherein the seal prevents fluid from flowing between the first chamber and the second chamber along the inner radial surface of the radial inner portion.

16. A torque converter comprising:
   a housing;
   a lock-up clutch, the lock-up clutch having a split piston having a radial inner portion and a radial outer portion;
   a drive plate connecting the housing and the radial outer portion;
   a turbine hub; and
   a seal between the radial inner portion and the radial outer portion, a radial outer end of the radial inner portion being radially outside of a radial inner end of the radial outer portion,
      wherein the seal is between the radial outer end of the radial inner portion and the radial inner end of the radial outer portion such that the seal is radially outside of the radial inner end of the radial outer portion and radially inside of the radial outer end of the radial inner portion.

17. The torque converter recited in claim 16 wherein the inner radial portion is C shaped so as to include an outer radial leg, an inner radial leg and a portion connecting the outer radial leg and the inner radial leg, the radial inner end of the radial outer portion including an axially extending flange, the seal contacting an outer radial surface of the flange and an inner radial surface of the outer radial leg.

18. The torque converter recited in claim 17 wherein the inner radial leg and the outer radial leg extend axially towards the cover and the flange extends axially away from the cover.

19. The torque converter recited in claim 17 further comprising an additional seal contacting the inner radial leg and the turbine hub.

* * * * *